No. 12,110. REISSUED MAY 12, 1903.

C. L. HILDRETH.

COILER HEAD.

APPLICATION FILED JAN. 6, 1903.

WITNESSES.

Channing Whitaker

Channing Whitaker, Jr.

INVENTOR.

Chas. L. Hildreth

THE NORRIS PETERS CO., PHOTO-LITHO., WASHINGTON, D. C.

No. 12,110. Reissued May 12, 1903.

UNITED STATES PATENT OFFICE.

CHARLES L. HILDRETH, OF LOWELL, MASSACHUSETTS, ASSIGNOR TO THE LOWELL MACHINE SHOP, OF LOWELL, MASSACHUSETTS, A CORPORATION OF MASSACHUSETTS.

COILER-HEAD.

SPECIFICATION forming part of Reissued Letters Patent No. 12,110, dated May 12, 1903.

Original No. 641,389, dated January 16, 1900. Application for reissue filed January 6, 1903. Serial No. 138,079.

*To all whom it may concern:*

Be it known that I, CHARLES L. HILDRETH, of Lowell, in the county of Middlesex and State of Massachusetts, have invented certain new and useful Improvements in Coiler-Heads, of which the following is a specification.

My invention relates to coiler-heads having an opening in the top of the casing which may be closed or may be opened readily to expose the operating mechanism of the coiler.

The object of my invention is to make it easy by means of a simplified construction to inspect or to oil that mechanism without stopping it or breaking or twisting the sliver or causing the sliver to gather flyings or dust.

Heretofore in such coiler-heads the trumpet has been made integral with or has been attached to the slide or cover for the opening and has been revoluble therewith to cover and uncover the opening in the casing, thereby unnecessarily twisting the sliver during the opening or closing thereof. Moreover, the flyings and dust which have collected upon the trumpet and upon the slide or cover while they are not in motion have been caught by and incorporated into the moving sliver and carried by the sliver into the coiler-can as the trumpet and slide or cover have passed beneath it. The soiling of the sliver, which occurs during the uncovering of the opening by ordinary operatives who exercise only ordinary care, is objectionable and is obviated by my invention, which is represented in Figures 1, 2, 3, and 4 and is of simplified construction.

Figure 1:
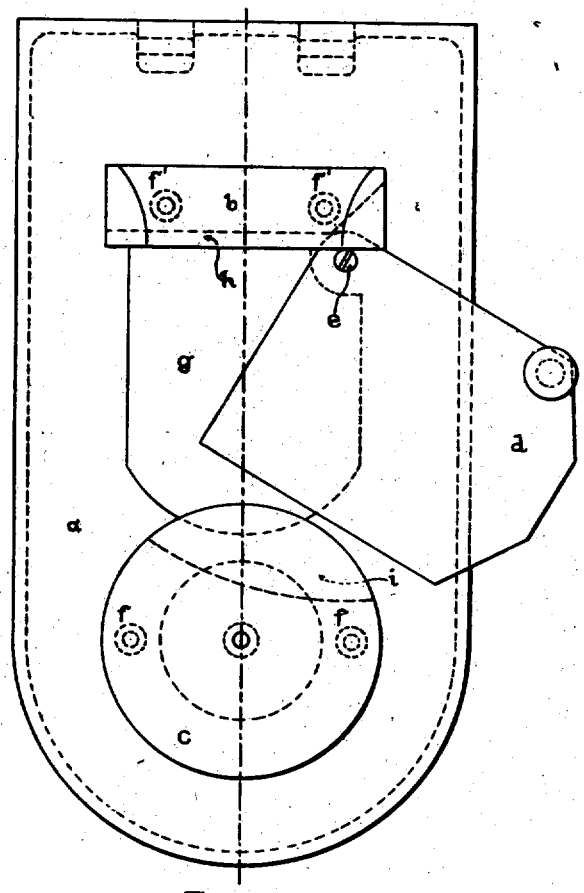
Figure 2:
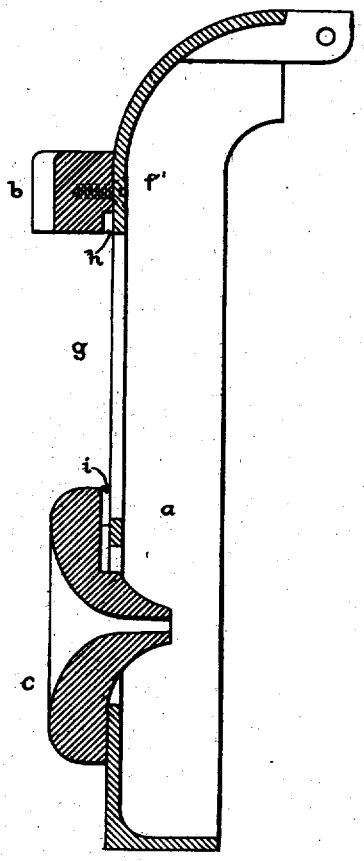
Figure 3:
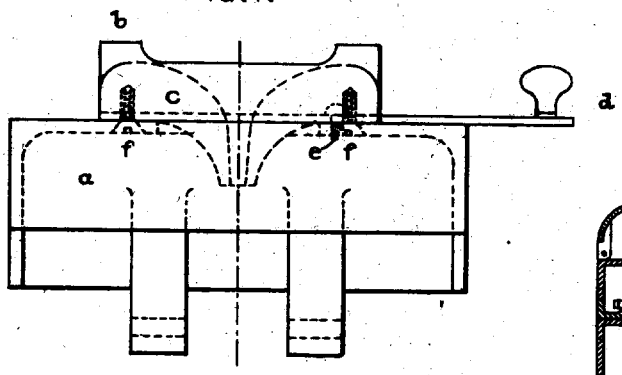
Figure 4:
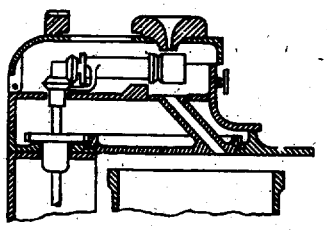

Fig. 1 is a plan of the cover of the coiler-head with the opening in the top thereof partially uncovered. Fig. 2 is a longitudinal section of the cover through the uncovered opening. Fig. 3 is an end elevation of the cover of the coiler-head, with the opening in the top thereof partially uncovered. Fig. 4 is a vertical longitudinal section of the coiler-head, showing the mechanism which requires inspection and oiling, but which is of usual construction and forms no part of this invention.

Similar letters refer to similar parts in the different views.

*a* represents the coiler-cover; *b*, the back sliver-guide; *c*, the trumpet sliver-guide, through which the sliver passes to the operating mechanism; *d*, the slide or cover for covering or uncovering the opening; *e*, the pivot upon which *d* turns in covering or uncovering the opening; *f f* and *f′ f′*, the means used for fastening the trumpet and back sliver-guides to the cover; *g*, the opening in the cover, through which the operating mechanism can be inspected or oiled; *h*, a rabbet in *b*, which receives a part of *d* when the opening is covered; *i* a rabbet in *c* which receives a part of *d* when the opening is covered.

The trumpet and back sliver-guides are made thicker than is usual, and the sliver is thereby raised so high above the slide or cover *d* that the slide or cover can be moved to cover or to uncover the opening without bringing the flyings or dust which have collected thereupon into the path of the moving sliver. Moreover, the trumpet sliver-guide does not rotate with the slide or cover, and therefore does not carry the flyings or dust which have collected thereupon into the path of the moving sliver. During the ordinary operation of the coiler *d* fits closely in *h* and *i* and tightly covers the opening *g*. The movement of the slide or cover *d* in closing the opening *g* is limited by the contact of the edge of the said slide or cover with the under portion of the fixed back sliver-guide *b*, which last thus serves as a back-stop for the slide or cover.

In my invention flyings and dust which have collected upon the top of the slide or cover or upon the top of the trumpet sliver-guide are not during the uncovering of the opening caught by and incorporated into the moving sliver and carried into the coiler-can.

I claim—

1. The combination with the casing of a coiler-head containing mechanism and having in its top an opening, of trumpet and back sliver-guides each of which is fixed to the said top and is rabbeted to receive a cover for the opening and a cover to cover the opening and fit into the rabbets of the trumpet and back sliver-guides and to uncover the opening in the casing, substantially as described.

2. The combination with the casing of a coiler-head containing mechanism and having in its top an opening, of trumpet and back sliver-guides each of which is fixed to the said top and is rabbeted to receive a cover for the opening and a cover pivoted to the casing-top near to the back sliver-guide to cover the opening and fit into the rabbets of the trumpet and back sliver-guides and to uncover the opening in the casing, substantially as described.

3. The combination with the casing of a coiler-head containing mechanism and having in its top an opening, of a trumpet-guide and a back sliver-guide each firmly attached to said casing at opposite ends of said opening and adapted to direct the sliver above and across said opening to the coiler calender-rolls, as described.

4. The combination with the casing of a coiler-head containing mechanism and having in its top an opening, of a trumpet-guide and a back sliver-guide, each of which is fixed to the said top and is rabbeted to receive a cover for the opening, the said top having in connection therewith a back-stop fixed to the said top and adapted to limit the movement of the slide or cover, and a slide or cover adapted to fit into the rabbets of the trumpet and back sliver-guides and movable to cover and uncover the opening in the casing as described.

In testimony whereof I affix my signature in the presence of two witnesses.

CHAS. L. HILDRETH.

Witnesses:

CHANNING WHITAKER,

H. R. BLANCHARD.